(12) United States Patent
Namikawa

(10) Patent No.: US 11,004,634 B2
(45) Date of Patent: May 11, 2021

(54) BREAKER AND SAFETY CIRCUIT PROVIDED WITH SAME

(71) Applicant: BOURNS KK, Osaka (JP)

(72) Inventor: Masashi Namikawa, Osaka (JP)

(73) Assignee: BOURNS KK, Osaka (JP)

( * ) Notice: Subject to any disclaimer, the term of this patent is extended or adjusted under 35 U.S.C. 154(b) by 0 days.

(21) Appl. No.: 16/631,810

(22) PCT Filed: Jul. 2, 2018

(86) PCT No.: PCT/JP2018/025087
§ 371 (c)(1),
(2) Date: Jan. 16, 2020

(87) PCT Pub. No.: WO2019/017195
PCT Pub. Date: Jan. 24, 2019

(65) Prior Publication Data
US 2020/0144009 A1    May 7, 2020

(30) Foreign Application Priority Data

Jul. 19, 2017   (JP) .............................. JP2017-140146

(51) Int. Cl.
*H01H 37/04* (2006.01)
*H01H 37/54* (2006.01)
(Continued)

(52) U.S. Cl.
CPC ............ *H01H 37/04* (2013.01); *H01H 37/54* (2013.01); *H01H 37/5418* (2013.01);
(Continued)

(58) Field of Classification Search
CPC ........ H01H 37/04; H01H 37/54; H01H 37/64; H01H 2037/046; H01H 2037/5463;
(Continued)

(56) References Cited

U.S. PATENT DOCUMENTS 9,159,985 B2 * 10/2015 Nakanishi ............. H01M 2/348
9,831,054 B2 * 11/2017 Chen ...................... H01H 37/52
(Continued)

FOREIGN PATENT DOCUMENTS

| JP | 2016-35822 | 3/2016 |
|---|---|---|
| JP | 2016-225142 | 12/2016 |

(Continued)

OTHER PUBLICATIONS

International Search Report dated Aug. 28, 2018, from International Application No. PCT/JP2018/025087, 2 pages.

*Primary Examiner* — Stephen S Sul
(74) *Attorney, Agent, or Firm* — Knobbe, Martens, Olson & Bear, LLP

(57) ABSTRACT

A breaker 1 includes a fixed piece 2 having a fixed contact 21, a movable piece 4 including a movable contact 41 and having the movable contact 41 so as to be pressed against and in contact with the fixed contact 21, a thermally actuated element 5 shifting the movable piece 4 from a conductive state to a cut-off state in accordance with a temperature change, and a case 7 accommodating the fixed piece 2, the movable piece 4, and the thermally actuated element 5. The case 7 includes a case main body 71 accommodating the movable piece 4 and the thermally actuated element 5, a lid member 81 covering a housing concave portion 73 of the case main body 71, and a metal plate 9 embedded in the lid member 81. Heat capacity of the metal plate 9 is larger than heat capacity of the fixed piece 2.

8 Claims, 4 Drawing Sheets

(51) Int. Cl.
*H01H 37/64* (2006.01)
*H01M 2/34* (2006.01)
*H01M 50/581* (2021.01)

(52) U.S. Cl.
CPC .......... *H01H 37/64* (2013.01); *H01M 50/581* (2021.01); *H01H 2037/046* (2013.01); *H01H 2037/5463* (2013.01)

(58) Field of Classification Search
CPC .. H01H 37/12; H01H 37/043; H01H 37/5436; H01H 37/5418; H01M 2/348; Y02E 60/10
USPC ......... 337/77, 102, 111, 362, 377, 379, 380, 337/381, 390
See application file for complete search history.

(56) References Cited

U.S. PATENT DOCUMENTS 9,831,056 B2 * 11/2017 Mochizuki ............. H01H 83/20
10,283,295 B2 * 5/2019 Mochizuki ............. H01H 37/46
2002/0060898 A1 * 5/2002 Nagai ................... H01M 2/348
361/634
2014/0285308 A1 * 9/2014 Namikawa ............. H01H 37/04
337/1
2014/0334055 A1 * 11/2014 Namikawa ............. H01H 37/52
361/115
2016/0035521 A1 * 2/2016 Namikawa ......... H01H 37/5427
337/380
2016/0035522 A1 2/2016 Namikawa
2017/0062167 A1 * 3/2017 Tanaka ................... H01H 37/52
2017/0236665 A1 * 8/2017 Furuuchi ............... H01H 37/761
337/414

FOREIGN PATENT DOCUMENTS

JP          2017-103118       6/2017
WO     WO 2015/029826 A1    3/2015
WO     WO 2019/017195 A1    1/2019

* cited by examiner

BREAKER AND SAFETY CIRCUIT PROVIDED WITH SAME

This application is a United States national phase application of International Application No. PCT/JP2018/025087, filed on Jul. 2, 2018, which claims priority to JP 2017-140146, filed on Jul. 19, 2017, the entire contents of each of which are hereby incorporated by reference in their entirety and for all purposes.

BACKGROUND OF THE INVENTION

Technical Field

The present invention relates to a small breaker and the like suitable for use in a safety circuit of an electrical device.

Background Art

Conventionally, a breaker is used as a protection device (safety circuit) for secondary batteries, motors, and the like of various electrical devices. When an abnormality occurs such as when the temperature of the secondary battery rises excessively during charging or discharging, or when an overcurrent flows through a motor or the like equipped in a device such as an automobile or home appliance, the breaker cuts off the current to protect the secondary batteries, the motors, and the like. In order to ensure the safety of equipment, a breaker used as such a protection device is required to operate accurately following temperature changes (to have good temperature characteristics) and to have a stable resistance value when energized.

The breaker is provided with a thermally actuated element that operates according to a temperature change so as to conduct or cut off a current. For example, Patent Document 1 has disclosed a breaker for which a bimetal is used as the thermally actuated element. Bimetal is an element that is formed by laminating two types of plate-shaped metal materials having different coefficients of thermal expansion, and controls the conduction state of the contact by changing its shape in accordance with a temperature change. The breaker shown in the above document is formed by parts such as a fixed piece, a terminal piece, a movable piece, a thermally actuated element, and a PTC thermistor housed in a case with terminals of the fixed piece and the terminal piece protruding from the case, and used by connecting to an electrical circuit of an electrical device (external circuit of the breaker).

In recent years, the breaker has been reduced in size, and as a result, for example, as disclosed in Patent Document 2, a technique for incorporating a breaker into a connector has been proposed. In the connector disclosed in this document, an insulator such as a synthetic resin is formed around the breaker and a circuit board. The insulator is formed, for example, by loading (inserting) the circuit board on which the breaker is mounted in a mold, and injecting a resin material into a cavity space and hardening it.

PRIOR ART DOCUMENTS

Patent Document

Patent document 1: Unexamined Japanese Patent Application Publication No. 2016-035822
Patent document 2: Unexamined Japanese Patent Application Publication No. 2016-225142

SUMMARY OF THE INVENTION

Problems to be Solved by the Invention

In the breakers disclosed in the Patent Documents 1 and 2, as the breaker temperature rises, the thermally actuated element snaps (reverses), and a movable contact is separated from a fixed contact. At this time, when a heat source exists in the vicinity of the breaker, heat may be supplied directly from the heat source or indirectly via the insulator or the like, and the temperature of the breaker may become higher than that of the circuit board. Even in such a case, if the heat transferred from the breaker to the circuit board becomes excessive, the temperature rise (i.e., snap deformation) of the thermally actuated element is delayed, therefore, it is possible that the breaker does not respond quickly to the temperature rise of the surroundings and does not operate quickly.

Furthermore, a slight leakage current flows through the thermally actuated element and the PTC thermistor, and make the PTC thermistor generate heat, therefore, the deformed state of the thermally actuated element is maintained (see paragraph (0088) and the like of the Patent Document 1).

In the breakers disclosed in the Patent Documents 1 and 2, since heat is transferred from the PTC thermistor to the external circuit via the fixed piece, the temperature of the thermally actuated element is lowered, therefore, there are some cases where the deformed state of the thermally actuated element is difficult to be stably maintained. Similarly, since heat is transferred from the PTC thermistor to the external circuit via the thermally actuated element, the movable piece, and the terminal piece, there are some cases where the deformed state of the thermally actuated element is difficult to be stably maintained.

The present invention has been made to solve the above-described problems, and an object thereof is to provide a breaker capable of improving the operational responsiveness of the breaker to an increase in ambient temperature.

Means for Solving the Problem

In order to achieve the above objective, the present invention is a breaker including a fixed piece which includes a fixed contact and is to be connected to an external circuit, a movable piece including an elastic portion which elastically deforms and a movable contact which is formed at one end portion of the elastic portion and having the movable contact so as to be pressed against and in contact with the fixed contact, a thermally actuated element which shifts, by deforming in accordance with a temperature change, the movable piece from a conductive state in which the movable contact is in contact with the fixed contact to a cut-off state in which the movable contact is separated from the fixed contact, and a case accommodating the fixed piece, the movable piece, and the thermally actuated element, characterized in that the case includes a first resin case having a housing concave portion for accommodating the movable piece and the thermally actuated element, a second resin case fixed to the first resin case so as to cover the housing concave portion, and a metal plate embedded in the second resin case, and heat capacity of the metal plate is larger than heat capacity of the fixed piece.

In the breaker according to the present invention, it is preferred that thickness of the metal plate is larger than thickness of the fixed piece.

In the breaker according to the present invention, it is preferred that the first resin case accommodates a terminal piece which electrically connects the movable piece and the external circuit, and the thickness of the metal plate is larger than thickness of the terminal piece.

In the breaker according to the present invention, it is preferred that the second resin case covers a top surface of the metal plate.

In the breaker according to the present invention, it is preferred that a through hole which penetrates the metal plate in a thickness direction thereof is formed in the metal plate, the second resin case includes a gate cut mark which is a trace of filling a resin material and a filling portion formed of the resin material filled in the through hole, the gate cut mark and the filling portion are arranged at overlapping positions when viewed from the thickness direction of the metal plate, the second resin case is arranged between the metal plate and the movable piece and has a contact portion which contacts the movable piece, the gate cut mark and the contact portion are arranged at overlapping positions when viewed from the thickness direction of the metal plate, and the contact portion presses the movable piece toward the terminal piece.

In the breaker according to the present invention, it is preferred that the thickness of the metal plate is larger than thickness of the elastic portion.

In the breaker according to the present invention, it is preferred that the thickness of the metal plate is 10% or more of a total thickness of the breaker.

A safety circuit for an electric device according to the present invention is characterized in that it is provided with the breaker described above.

Advantageous Effects of the Invention

According to the breaker of the present invention, the temperature of the thermally actuated element is easily maintained by the heat stored in the metal plate having the larger heat capacity than that of the fixed piece. Therefore, delay in temperature rise of the thermally actuated element due to heat radiation from the fixed piece to the external circuit is suppressed, and thermal responsiveness of the thermally actuated element is increased, and operational responsiveness of the breaker to the rise in the ambient temperature can be easily increased.

BRIEF DESCRIPTION OF THE DRAWINGS

FIG. 3 a cross-sectional view showing the above-mentioned breaker in an overcharged state or an abnormality and the like.

DETAILED DESCRIPTION OF THE PREFERRED EMBODIMENT

A breaker according to an embodiment of the first invention of the present invention will be described with reference to the drawings. FIGS. 1 to 4 show the configuration of the breaker. As shown in FIGS. 1 to 4, the breaker 1 is provided with a pair of terminals 22 and 32 which are partially exposed from a case 7 to the outside. The terminals 22 and 32 are electrically connected to an external circuit (not shown), therefore, the breaker 1 constitutes a main part of the safety circuit of the electric device.

Figure 1:
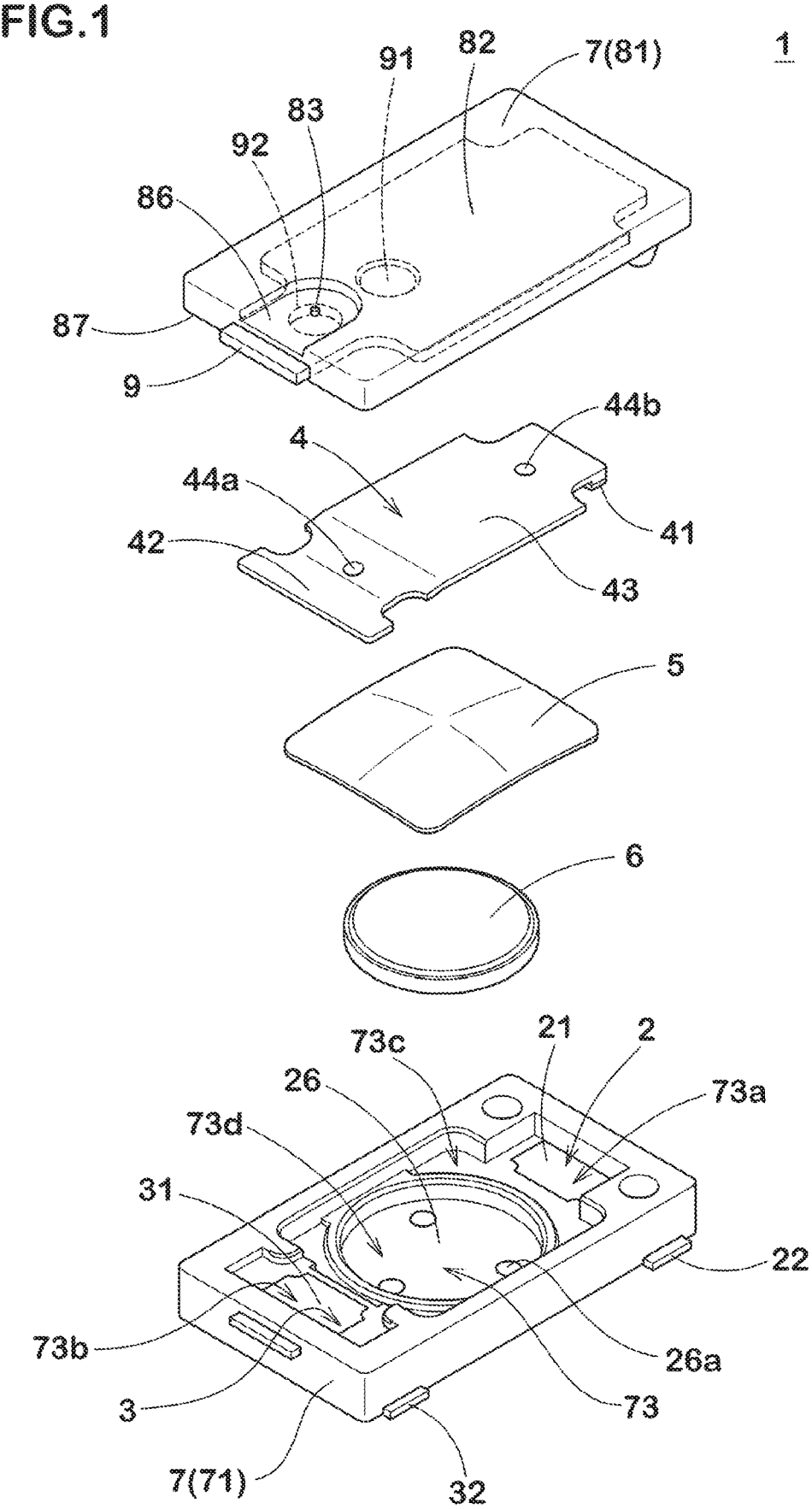
FIG. 1 a perspective view showing schematic configuration of a breaker, before assembly, according to one embodiment of the present invention.

As shown in FIG. 1, the breaker 1 includes a fixed piece 2 having a fixed contact 21 and the terminals 22, a terminal piece 3 having the terminals 32, a movable piece 4 having a movable contact 41 at a tip portion thereof, a thermally actuated element 5 which deforms in accordance with a temperature change, a PTC (Positive Temperature Coefficient) thermistor 6, the case 7 which accommodates the fixed piece 2, the terminal piece 3, the movable piece 4, the thermally actuated element 5, and the PTC thermistor 6, and the like. The case 7 is composed of a case main body (first resin case) 71, a lid member (second resin case) 81, which is attached to an upper surface of the case main body 71, and the like.

The fixed piece 2 is formed by, for example, pressing a metal plate mainly composed of copper or the like (in addition, a metal plate of copper-titanium alloy, nickel silver, or brass, etc.) and is embedded in the case main body 71 by insert molding.

The fixed contact 21 is formed by cladding, plating, coating, and the like of an electrically conductive material such as copper-silver alloy, gold-silver alloy, in addition to silver, nickel, nickel-silver alloy. The fixed contact 21 is formed at a position facing the movable contact 41 of the fixed piece 2, and is exposed to a housing concave portion 73 of the case main body 71 through a part of an opening (73a) formed inside the case main body 71.

In the present application, unless otherwise specified, in the fixed piece 2, the surface on which the fixed contact 21 is formed (that is, the upper surface in FIG. 1) is described as a first surface, and the bottom surface on the opposite side is described as a second surface. The same applies to other parts such as the terminal piece 3, the movable piece 4, the thermally actuated element 5, the case 7, a metal plate 9, and the like, for example.

Figure 3:
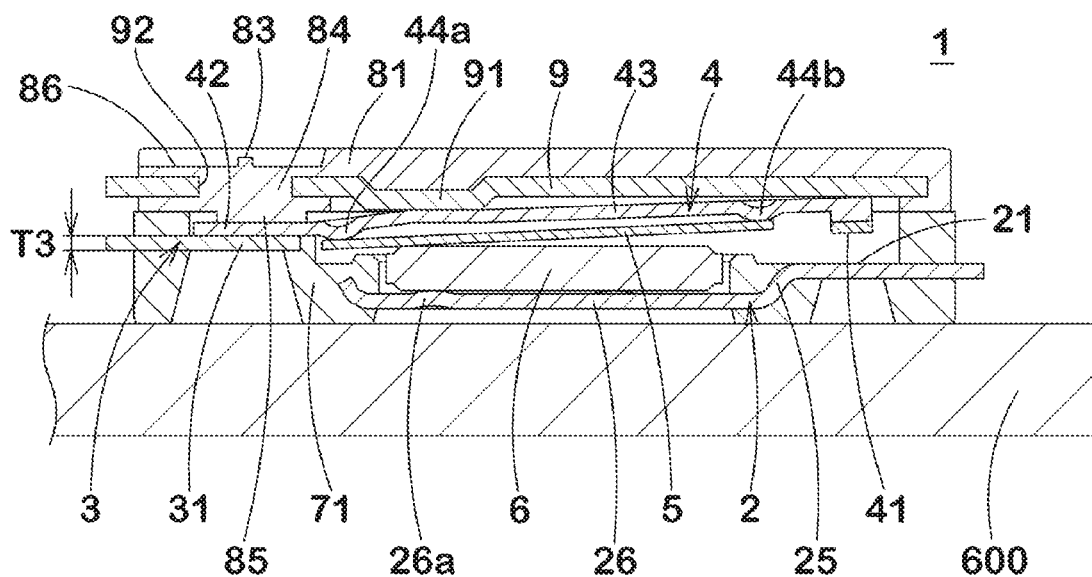
Figure 4:
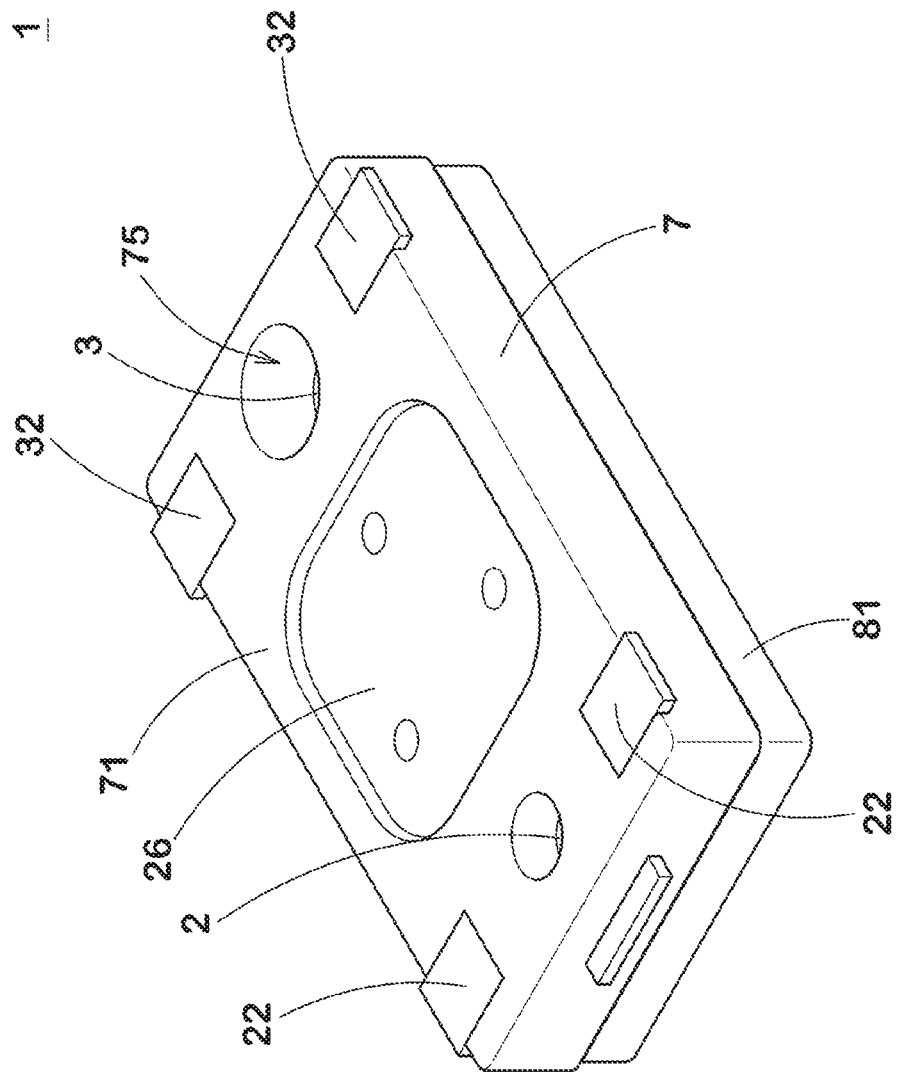
FIG. 4 a perspective view from a bottom side of the above-mentioned breaker.

As shown in FIG. 4, the terminals 22 are exposed from a bottom surface of the case main body 71 and is connected to lands of a circuit board 600 (see FIGS. 2 and 3) by a technique such as soldering. In the present embodiment, a pair of the terminals 22 are arranged in a short direction of the breaker 1.

Figure 2:
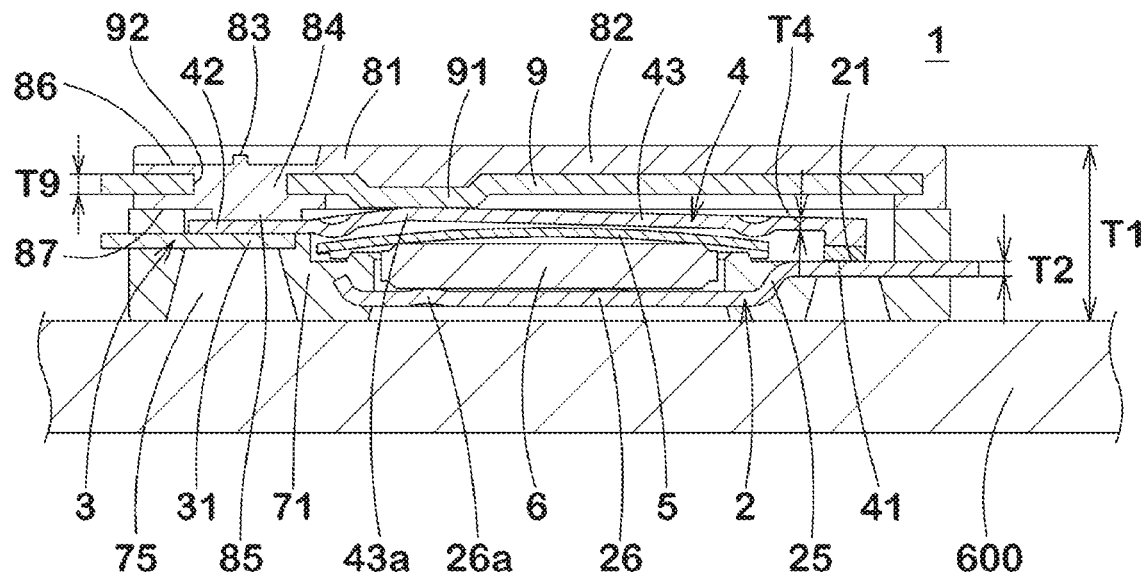
FIG. 2 a cross-sectional view showing the above-mentioned breaker in a normal charge or discharge state.

As shown in FIG. 2, the fixed piece 2 includes a step-wise bent portion 25 bent in a step shape (a crank shape in a side view) and a support portion 26 which supports the PTC thermistor 6. The step-wise bent portion 25 connects the fixed contact 21 and the support portion 26 so that the fixed contact 21 and the support portion 26 are arranged at different heights. The PTC thermistor 6 is placed on protrusions (dowels) (26a) formed in a convex manner at three locations in the support portion 26 and supported by the protrusions (26a).

Similarly to the fixed piece 2, the terminal piece 3 is formed by pressing a metal plate mainly composed of copper or the like, and is embedded in the case main body 71 by insert molding. The terminal piece 3 has a connection portion 31 to be connected to the movable piece 4 and the terminals 32. The connection portion 31 and the terminals 32 are arranged at different heights by step-wise bent portions (not shown) embedded in the case main body 71.

The connection portion 31 is exposed to the housing concave portion 73 of the case main body 71 from a part of an opening (73b) formed inside the case main body 71 and is electrically connected to the movable piece 4. On the other hand, as shown in FIG. 4, the terminals 32 are exposed from the bottom surface of the case main body 71 and are connected to the lands of the circuit board 600 by a technique such as soldering. In the present embodiment, a pair of the terminals 32 are arranged in the short direction of the breaker 1.

The movable piece 4 is formed by pressing a plate-shaped metal material mainly composed of copper or the like. The movable piece 4 is formed in an arm shape symmetrical to a center line thereof in a longitudinal direction thereof.

The movable contact 41 is formed at one end portion of the movable piece 4. The movable contact 41 is formed on the second surface of the movable piece 4 by an equivalent material to the fixed contact 21, and is joined to the tip portion of the movable piece 4 by a technique such as clad or crimping in addition to welding.

At the other end of the movable piece 4, a connection portion 42 which is to be electrically connected to the connection portion 31 of the terminal piece 3 is formed. The first surface of the connection portion 31 of the terminal piece 3 and the second surface of the connection portion 42 of the movable piece 4 are fixed together by laser welding. Laser welding is a welding technique in which workpieces are joined together by irradiating workpieces (which are the terminal piece 3 and the movable piece 4 in the present embodiment) with laser light and locally melting and solidifying the workpieces. On the surface of the workpiece irradiated with laser light, a laser welding mark having a form different from the welding mark by other welding technique (for example, resistance welding using Joule heat) is formed.

The movable piece 4 has an elastic portion 43 between the movable contact 41 and the connection portion 42. The elastic portion 43 extends from the connection portion 42 toward the movable contact 41. Thereby, the connection portion 42 is provided on the side opposite to the movable contact 41 with the elastic portion 43 interposed therebetween.

At the connection portion 42, the movable piece 4 is fixed by being fixed to the connection portion 31 of the terminal piece 3, and by the elastic portion 43 being elastically deformed, the movable contact 41 formed at the tip of the movable piece 4 is pressed against and in contact with the fixed contact 21, therefore, the fixed piece 2 and the movable piece 4 can be energized. Since the movable piece 4 and the terminal piece 3 are electrically connected at the connection portion 31 and the connection portion 42, the fixed piece 2 and the terminal piece 3 can be energized.

The movable piece 4 is curved or bent in the elastic portion 43 by pressing. The degree of curving or bending is not particularly limited as long as the thermally actuated element 5 can be accommodated, and may be appropriately set in consideration of elastic force at an operating temperature and a reset temperature, contact pressure of the contact point, and the like. In addition, a pair of protrusions (contact portions) (44a) and (44b) is formed on the second surface of the elastic portion 43 such that they face the thermally actuated element 5. The protrusions (44a) and (44b) and the thermally actuated element 5 come into contact with each other, and the deformation of the thermally actuated element 5 is transmitted to the elastic portion 43 via the protrusions (44a) and (44b) (see FIGS. 1 and 3).

The thermally actuated element 5 shifts the movable contact 41 from a conductive state in which the movable contact 41 is in contact with the fixed contact 21 to a cut-off state in which the movable contact 41 is separated from the fixed contact 21. The thermally actuated element 5 has an initial shape which is curved in an arc shape and is formed by laminating thin plate materials having different coefficients of thermal expansion. When the operating temperature is reached due to overheating, the curved shape of the thermally actuated element 5 is warped in reverse with a snap motion, and is restored when the temperature falls below the reset temperature due to cooling. The initial shape of thermally actuated element 5 can be formed by pressing. As long as the elastic portion 43 of the movable piece 4 is pushed up by the reverse warping motion of the thermally actuated element 5 at the desired temperature and returns to its initial state by the elastic force of the elastic portion 43, the material and the shape of the thermally actuated element 5 are not particularly limited, but a rectangular shape is preferred from the point of view of productivity and efficiency of the reverse warping motion, and a rectangular shape close to a square is more preferred in order to efficiently push up the elastic portion 43 while being small. Note that, as the materials of the thermally actuated element 5, a laminate of two types of materials having different coefficients of thermal expansion made of various alloys such as nickel silver, brass, and stainless steel, for example, copper-nickel-manganese alloy or nickel-chromium-iron alloy on the high expansion side, and iron-nickel alloy on the low expansion side, is used in combination according to the required conditions.

The PTC thermistor 6 makes the fixed piece 2 and the movable piece 4 conductive when the movable piece 4 is in the cut-off state. The PTC thermistor 6 is disposed between the support portion 26 of the fixed piece 2 and the thermally actuated element 5. That is, the support portion 26 is located immediately below the thermally actuated element 5 with the PTC thermistor 6 in between. When the energization of the fixed piece 2 and the movable piece 4 is interrupted by the reverse warping motion of the thermally actuated element 5, the current flowing through the PTC thermistor 6 is increased. As long as the PTC thermistor 6 is a positive temperature coefficient thermistor which limits the current by increasing the resistance value as the temperature increases, the type of the PTC thermistor 6 can be selected according to the requirements such as operating current, operating voltage, operating temperature, reset temperature, and the like, and the materials and the shape are not particularly limited as long as these properties are not impaired. In this embodiment, a ceramic sintered body containing barium titanate, strontium titanate or calcium titanate is used. In addition to the ceramic sintered body, a so-called polymer PTC in which electrically conductive particles such as carbon are contained in a polymer may be used.

The case main body 71 and the lid member 81 constituting the case 7 are made of thermoplastic resin such as flame-retardant polyamide, polyphenylene sulfide (PPS) having excellent heat resistance, liquid crystal polymer (LCP), polybutylene terephthalate (PBT), and the like. A material other than the resin may be used as long as characteristics equal to or higher than those of the above-described resin can be obtained.

The case main body 71 is formed with the housing concave portion 73 which is an internal space for accommodating the movable piece 4, the thermally actuated element 5, the PTC thermistor 6, and the like. The housing concave portion 73 has the openings (73a) and (73b) for accommodating the movable piece 4, an opening (73c) for accommodating the movable piece 4 and the thermally actuated element 5, an opening (73d) for accommodating the PTC thermistor 6, and the like. Note that edges of the movable piece 4 and the thermally actuated element 5 incorporated in the case main body 71 are in contact with a frame formed inside the housing concave portion 73, and are guided by the frame when the thermally actuated element 5 is reversely warped.

The metal plate 9 is embedded in the lid member 81 by insert molding. The metal plate 9 is formed by pressing a metal plate mainly composed of copper or the like, or a metal plate such as stainless steel or the like. As shown in FIG. 2 and FIG. 3, the metal plate 9 appropriately contacts with the first surface of the movable piece 4 to restrict the movement of the movable piece 4, and contributes to the miniaturization of the breaker 1 while increasing the rigidity and the strength of the lid member 81, and consequently those of the case 7 as a housing body.

As shown in FIG. 1, the lid member 81 is attached to the case main body 71 so as to close the openings (73$a$), (73$b$), (73$c$), and so on of the case main body 71 which accommodates the fixed piece 2, the terminal piece 3, the movable piece 4, the thermally actuated element 5, the PTC thermistor 6, and the like. The case main body 71 and the lid member 81 are joined together by ultrasonic welding, for example. At this time, the case main body 71 and the lid member 81 are continuously joined together over the entire circumference of each outer edge portion, therefore, the airtightness of the case 7 is improved. As a result, the internal space of the case 7 provided by the housing concave portion 73 is sealed, therefore, parts such as the movable piece 4, the thermally actuated element 5, and the PTC thermistor 6 can be shielded and protected from the atmosphere outside the case 7. In the present embodiment, since the resin is entirely disposed on the first surface side of the metal plate 9, the airtightness of the housing concave portion 73 is further increased.

FIG. 2 shows the operation of the breaker 1 in a normal charge or discharge state. In FIG. 2, the breaker 1 is shown with the circuit board 600 (the same applied to FIG. 3 as well). In a normal charge or discharge state, the thermally actuated element 5 maintains its initial shape (before the reverse warping). The metal plate 9 is provided with a protruding portion 91 which is to contact with a top portion (43$a$) of the movable piece 4 so as to press the top portion (43$a$) toward the thermally actuated element 5. By the protruding portion 91 pressing the top portion (43$a$), the elastic portion 43 is elastically deformed, and the movable contact 41 formed at the tip of the elastic portion 43 is pressed against and in contact with the fixed contact 21. Thereby, the fixed piece 2 and the terminal piece 3 of the breaker 1 are electrically connected through the elastic portion 43 of the movable piece 4 and so on. When the elastic portion 43 of the movable piece 4 and the thermally actuated element 5 are in contact with each other, the movable piece 4, the thermally actuated element 5, the PTC thermistor 6, and the fixed piece 2 may be electrically connected as a circuit. However, since the resistance of the PTC thermistor 6 is overwhelmingly larger than that of the movable piece 4, the current flowing through the PTC thermistor 6 is substantially negligible compared to the amount flowing through the fixed contact 21 and the movable contact 41.

FIG. 3 shows the operation of the breaker 1 in an overcharged state or an abnormality and the like. When the high temperature state is reached due to overcharge or abnormality, the thermally actuated element 5 which has reached the operating temperature is warped in reverse, the elastic portion 43 of the movable piece 4 is pushed up, therefore, the fixed contact 21 and the movable contact 41 are separated. The operating temperature of the thermally actuated element 5 when the thermally actuated element 5 is deformed inside the breaker 1 and pushes up the movable piece 4 is 70 degrees Celsius or more and 90 degrees Celsius or less, for example. At this time, the current which has flowed between the fixed contact 21 and the movable contact 41 is cut off, and a slight leakage current flows through the thermally actuated element 5 and the PTC thermistor 6. The PTC thermistor 6 continues to generate heat as long as this leakage current flows, and greatly increases the resistance while maintaining the thermally actuated element 5 in the reverse warped state, therefore, the current does not flow the path between the fixed contact 21 and the movable contact 41, and only the slight leakage current described above exists (constitutes a self-holding circuit). This leakage current can be used for other functions of the safety equipment.

The heat capacity of the metal plate 9 of the present embodiment is larger than the heat capacity of the fixed piece 2. The metal plate 9 configured as such can be realized by forming the metal plate 9 with a metal having a large specific heat and/or increasing the volume of the metal plate 9.

In the present embodiment, the metal plate 9 is formed to have a thickness T9 larger than a thickness T2 of the fixed piece 2 (see FIG. 2). Thereby, it is possible to easily secure the heat capacity of the metal plate 9 by increasing the volume of the metal plate 9 while suppressing the size of the breaker 1 in plan view, that is, the occupied area of the case 7.

The temperature of the thermally actuated element 5 is easily adjusted by the heat stored in the metal plate 9 having a larger heat capacity than the fixed piece 2. Accordingly, in the transitions from the conductive state shown in FIG. 2 to the cut-off state shown in FIG. 3, the delay in temperature rise of the thermally actuated element due to heat radiation from the fixed piece to the external circuit is suppressed, and thermal responsiveness of the thermally actuated element is increased, and the operational responsiveness of the breaker to the increase in the ambient temperature can be easily increased. Further, in the cut-off state shown in FIG. 3, the temperature decrease of the thermally actuated element 5 due to heat dissipation from the fixed piece 2 to the external circuit is suppressed, therefore, it is possible that the deformed state of the thermally actuated element 5 is maintained stably. Thereby, it is possible that the current cut-off state by the breaker 1 is maintained stably.

Further, since the fixed piece 2 is formed such that the thickness T2 is smaller than the thickness T9 of the metal plate 9, the amount of heat transmitted and dissipated to the external circuit through the fixed piece 2 is suppressed. Thereby, similarly to the above, it is possible that the deformed state of the thermally actuated element 5 in the cut-off state is maintained stably while easily increasing the operational responsiveness of the breaker to the increase in the ambient temperature.

In the present embodiment, the metal plate 9 is formed such that the thickness T9 is larger than a thickness T3 of the terminal piece 3, therefore, the heat capacity of the metal plate 9 of the present embodiment is larger than the heat capacity of the terminal piece 3. Then the temperature of the thermally actuated element 5 is easily maintained by the heat stored in the metal plate 9 having the larger heat capacity than the terminal piece 3. Therefore, similarly to the above, it is possible that the deformed state of the thermally actuated element 5 in the cut-off state is maintained stably while easily increasing the operational responsiveness of the breaker to the increase in the ambient temperature.

Further, since the terminal piece 3 is formed such that the thickness T3 is smaller than the thickness T9 of the metal plate 9, the amount of heat transferred and dissipated to the external circuit through the terminal piece 3 is suppressed. Thereby, similarly to the above, it is possible that the deformed state of the thermally actuated element 5 in the cut-off state is maintained stably while easily increasing the operational responsiveness of the breaker to the increase in the ambient temperature.

As shown in FIGS. 1 to 3, the lid member 81 covers a top surface of the metal plate 9. Among the surfaces of the metal plate 9, the top surface of the metal plate 9 is the first surface opposite to the second surface which faces the movable piece 4. The amount of heat released from the metal plate 9 to the outside of the breaker 1 by radiation or heat transfer is suppressed by the lid member 81 covering the top surface of the metal plate 9. Thereby, similarly to the above, it is possible that the deformed state of the thermally actuated element 5 in the cut-off state is maintained stably while easily increasing the operational responsiveness of the breaker to the increase in the ambient temperature.

Further, the case 7 is reinforced by the metal plate 9 embedded in the lid member 81, therefore, the deformation of the case 7 is suppressed. Particularly in the present embodiment, the metal plate 9 is formed such that the thickness T9 is larger than the thickness T2 of the fixed piece 2. Thereby, the lid member 81 is selectively reinforced, therefore, most of the stress applied to the lid member 81 is borne by the metal plate 9. Thereby, the deformation of the lid member 81 is suppressed.

On the other hand, the case main body 71 in which the fixed piece 2 is accommodated is reinforced by the circuit board 600 that constitutes the external circuit to which the fixed piece 2 is connected. That is, part of the stress applied to the case main body 71 is distributed to the circuit board 600. The deformation of the case main body 71 is suppressed. As described above, the deformation of the lid member 81 and the case main body 71 is suppressed, therefore, the deformation of the entire case 7 of the breaker 1 is suppressed.

In the present embodiment, the breaker 1 is mounted on the circuit board 600 such that the second surface of the case main body 71 is in contact with the circuit board 600 or has a slight distance therebetween. Thereby, since the resin material hardly enters between the second surface of the case main body 71 and the circuit board 600, the pressure applied to the second surface of the case main body 71 is restrictive, therefore, the deformation of the case main body 71 is suppressed.

In particular, in an embodiment in which the breaker 1 and the circuit board 600 are built in a connector and the resin material is filled outside the breaker 1 and the circuit board 600, the deformation of the case 7 due to the filling pressure of the resin material at the time of injection molding is remarkably suppressed by the metal plate 9 described above. Thereby, the positional relationship between the fixed piece 2 and the movable piece 4 is stabilized, and desired temperature characteristics can be easily obtained.

In the present embodiment, the first surface of the metal plate 9 is embedded in the lid member 81 in a central region 82 which is a part other than edges of the lid member 81. Thereby, the lid member 81 and the metal plate 9 are firmly joined together without a gap, therefore, the airtightness of the case 7 is further increased in combination with the configuration of the metal plate 9 described above. Thereby, for example, even if a reflow soldering process is applied to connect the terminals 22 and 32 of the breaker 1 and the lands of the circuit board 600, flux is prevented from entering inside the case 7, therefore, the influence on the metals which form the thermally actuated element 5 and the like is suppressed.

A through hole 92 is formed in the metal plate 9. The through hole 92 penetrates the metal plate 9 in a thickness direction thereof.

The lid member 81 includes a gate cut mark 83 which is a trace of the resin material cut after filled in the mold gate in injection molding and a filling portion 84 (see FIG. 2) formed of the resin material filled in the through hole 92. The filling portion 84 is formed inside the through hole 92.

The gate cut mark 83 is provided so as to protrude from a bottom surface of a concave portion 86 provided on the first surface of the lid member 81. Thereby, the protrusion of the gate cut mark 83 from the main body of the lid member 81 is suppressed.

In the mold for molding the lid member 81, the gate is formed at a position facing the through hole 92 on the first surface side of the metal plate 9 to be inserted into the mold. That is, the gate cut mark 83 and the filling portion 84 are arranged at overlapping positions when viewed from the thickness direction of the metal plate 9. Thereby, the resin material flowing in from the gate flows directly into the through hole 92 and smoothly reaches the second surface side of the metal plate 9. Therefore, filling property of the resin material on the second surface side of the metal plate 9 is improved, thereby, the resin to be welded to the case main body 71 can be easily supplied to the second surface side of the metal plate 9.

The lid member 81 has a contact portion 85, which contacts the first surface of the connection portion 42 of the movable piece 4, on the second surface side of the metal plate 9. The contact portion 85 is arranged between the metal plate 9 and the movable piece 4. The contact portion 85 is formed so as to protrude from the second surface of the metal plate 9 toward the movable piece 4. The contact portion 85 protrudes toward the case main body 71 from an edge portion 87 of the lid member 81.

The contact portion 85 presses the connection portion 42 of the movable piece 4 toward the connection portion 31 of the terminal piece 3 by contacting the connection portion 42 of the movable piece 4. Thereby, contact resistance between the movable piece 4 and terminal piece 3 is decreased.

The gate cut mark 83 and the contact portion 85 are arranged at overlapping positions when viewed from the thickness direction of the metal plate 9. That is, the gate cut mark 83, the filling portion 84, and the contact portion 85 are arranged on a straight line. Thereby, the resin material flowing in from the gate smoothly flows into the cavity space for forming the contact portion 85 via the through hole 92. Therefore, the filling property of the resin material into the contact portion 85 is improved, thereby, molding accuracy of the contact portion 85 can be easily increased.

An opening 75 is provided on the second surface of the case main body 71. The opening 75 exposes the second surface of the connection portion 31 which is part of the terminal piece 3. By applying laser light through the opening 75, the connection portion 31 of the terminal piece 3 and the connection portion 42 of the movable piece 4 are welded. In the present embodiment, when the lid member 81 is welded to the case main body 71, the connection portion 42 of the movable piece 4 is temporarily fixed by being sandwiched by the connection portion 31 of the terminal piece 3 and the contact portion 85 of the lid member 81. Thereby, the positioning accuracy of the movable piece 4 during welding is sufficiently ensured.

It is preferred that the thickness T9 of the metal plate 9 is larger than a thickness T4 of the elastic portion 43 of the movable piece 4. The thickness T4 of the elastic portion 43 is set in consideration of securing contact pressure of the movable contact 41 against the fixed contact 21, enabling the elastic portion 43 to generate sufficient elastic force, and further electric resistance of the movable piece 4. Then, the thickness T9 of the metal plate 9 is set to be larger than the thickness T4 of the elastic portion 43 of the movable piece 4, whereby the reinforcing effect of the case 7 by the metal plate 9 is further increased.

It is preferred that the thickness T9 of the metal plate 9 is 10% or more of a total thickness T1 of the breaker 1. When the breaker 1 is built into a connector or the like, it is required to make the breaker 1 smaller (low profile), wherein by setting the thickness T9 of the metal plate 9 to be 10% or more of the total thickness T1 of the breaker 1, the reinforcing effect of the case 7 by the metal plate 9 is sufficiently obtained.

Normally, when the thickness T9 of the metal plate 9 is 10% or more of the total thickness T1 of the breaker 1, it is possible that the filling property of the resin material from the gate on the first surface side of the metal plate 9 to the cavity space on the second surface side is deteriorated. However, in the present embodiment, the gate cut mark 83, the filling portion 84, and the contact portion 85 are formed at overlapping positions when viewed from the thickness direction of the metal plate 9. That is, since the gate, the through hole 92, and the contact portion 85 are arranged on a straight line, good filling property is obtained from the gate on the first surface side to the cavity space on the second surface side.

The breaker 1 of the present invention can be embodied with various modifications without being limited to the configuration of the above-illustrated embodiment. That is, it suffices as long as the breaker 1 at least includes the fixed piece 2 which includes the fixed contact 21 and is to be connected to an external circuit, the movable piece 4 including the elastic portion 43 which elastically deforms and the movable contact 41 which is formed at one end portion of the elastic portion 43 and having the movable contact 41 so as to be pressed against and in contact with the fixed contact 21, the thermally actuated element 5 which shifts, by deforming in accordance with a temperature change, the movable piece 4 from the conductive state in which the movable contact 41 is in contact with the fixed contact 21 to the cut-off state in which the movable contact 41 is separated from the fixed contact 21, and the case 7 accommodating the fixed piece 2, the movable piece 4, and the thermally actuated element 5, wherein the case 7 includes the case main body 71 having the housing concave portion 73 for accommodating the movable piece 4 and the thermally actuated element 5, the lid member 81 fixed to the case main body 71 so as to cover the housing concave portion 73, and the metal plate 9 embedded in the lid member 81, and the heat capacity of the metal plate 9 is larger than the heat capacity of the fixed piece 2.

For example, the joining method of the case main body 71 and the lid member 81 is not limited to ultrasonic welding, and can be appropriately applied as long as both are firmly joined together. For example, a liquid or gel adhesive may be applied, filled, and cured to bond them together. Further, the case 7 is not limited to the configuration in which it is constituted by the case main body 71, the lid member 81, and the like, and it suffices as long as the case 7 is constituted by two or more parts.

Further, the case 7 may be sealed with resin or the like by secondary insert molding or the like. Thereby, the airtightness of the case 7 is further increased. In the present embodiment, even when the filling pressure of the resin material at the time of secondary insert molding is applied to the lid member 81, since the lid member 81 is reinforced by the metal plate 9, the deformation of the lid member 81 and consequently that of the case 7 is suppressed.

Furthermore, the movable piece 4 and the thermally actuated element 5 may be integrally formed by forming the movable piece 4 of a laminated metal such as bimetal or tri-metal. In this case, the configuration of the breaker is simplified, therefore, further miniaturization can be achieved.

Still furthermore, the present invention may be applied to the configuration in which the terminal piece 3 and the movable piece 4 are integrally formed as shown in the Patent Application Publication No. WO2011/105175.

In the present embodiment, the self-holding circuit performed by the PTC thermistor 6 is provided, however, the present invention can be applied to the embodiment in which such a configuration is omitted. Even in such an embodiment, the thermal responsiveness of the thermally actuated element is increased, therefore, the operational responsiveness of the breaker to the increase in the ambient temperature can be easily increased.

Figure 5:
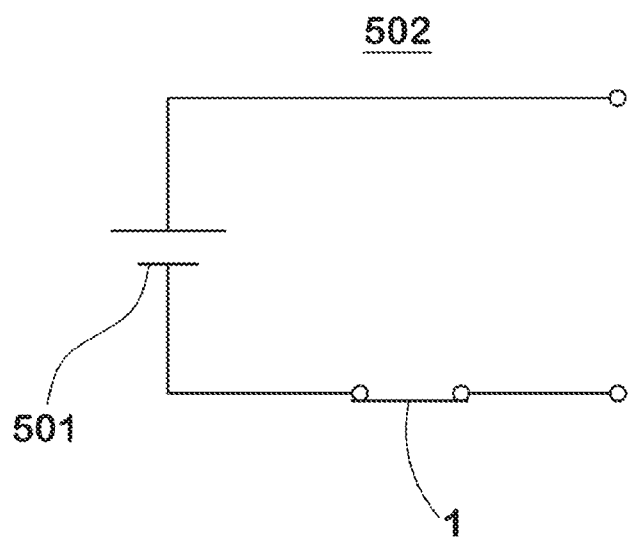
FIG. 5 a circuit diagram of a safety circuit provided with the above-mentioned breaker of the present invention.

Further, the breaker 1 of the present invention can be widely applied to a secondary battery pack, a safety circuit for an electric device, and the like. FIG. 5 shows a safety circuit 502 for an electric device. The safety circuit 502 includes the breaker 1 in series in an output circuit of a secondary battery 501. A part of the safety circuit 502 may be constituted by a cable including a connector provided with the breaker.

DESCRIPTION OF THE REFERENCE NUMERALS 1 breaker
2 fixed piece
3 terminal piece
4 movable piece
5 thermally actuated element
6 PTC thermistor
7 case
9 metal plate
21 fixed contact
22 terminal
31 connection portion
32 terminal
41 movable contact
42 connection portion
43 elastic portion
71 case main body (first resin case)
73 housing concave portion
81 lid member (second resin case)
83 gate cut mark
84 filling portion
85 contact portion
502 safety circuit
600 circuit board

What is claimed is:

1. A breaker comprising:
   a fixed piece which includes a fixed contact and is to be connected to an external circuit;
   a movable piece including an elastic portion which elastically deforms and a movable contact which is formed at one end portion of the elastic portion and having the movable contact so as to be pressed against and in contact with the fixed contact;
   a thermally actuated element which shifts, by deforming in accordance with a temperature change, the movable piece from a conductive state in which the movable contact is in contact with the fixed contact to a cut-off state in which the movable contact is separated from the fixed contact; and
   a case accommodating the fixed piece, the movable piece, and the thermally actuated element, wherein the case comprises:
      a first resin case having a housing concave portion for accommodating the movable piece and the thermally actuated element;
      a second resin case fixed to the first resin case so as to cover the housing concave portion; and
      a metal plate embedded in the second resin case,
      wherein a heat capacity of the metal plate is larger than a heat capacity of the fixed piece.

2. The breaker as set forth in claim 1, wherein a thickness of the metal plate is larger than a thickness of the fixed piece.

3. The breaker as set forth in claim 1, wherein the first resin case accommodates a terminal piece which electrically connects the movable piece and the external circuit, and a thickness of the metal plate is larger than a thickness of the terminal piece.

4. The breaker as set forth in claim 3, wherein
   a through hole which penetrates the metal plate in a thickness direction thereof is formed in the metal plate,
   the second resin case includes a gate cut mark which is a trace of filling a resin material and a filling portion formed of the resin material filled in the through hole,
   the gate cut mark and the filling portion are arranged at overlapping positions when viewed from the thickness direction of the metal plate,
   the second resin case is arranged between the metal plate and the movable piece and has a contact portion which contacts the movable piece,
   the gate cut mark and the contact portion are arranged at overlapping positions when viewed from the thickness direction of the metal plate, and
   the contact portion presses the movable piece toward the terminal piece.

5. The breaker as set forth in claim 1, wherein the second resin case covers a top surface of the metal plate.

6. The breaker as set forth in claim 1, wherein a thickness of the metal plate is larger than a thickness of the elastic portion.

7. The breaker as set forth in claim 1, wherein a thickness of the metal plate is 10% or more of a total thickness of the breaker.

8. A safety circuit for an electric device provided with the breaker as set forth in claim 1.

* * * * *